US011888312B2

(12) United States Patent
Zhang

(10) Patent No.: US 11,888,312 B2
(45) Date of Patent: Jan. 30, 2024

(54) SOLID STATE CIRCUIT BREAKER WITH REDUCED CLAMPING VOLTAGE

(71) Applicant: The United States of America, as represented by the Secretary of the Navy, Arlington, VA (US)

(72) Inventor: Di Zhang, Carmel, CA (US)

(73) Assignee: The Government of the United States of America, represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 17/684,335

(22) Filed: Mar. 1, 2022

(65) Prior Publication Data
US 2022/0329063 A1 Oct. 13, 2022

Related U.S. Application Data

(60) Provisional application No. 63/173,329, filed on Apr. 9, 2021.

(51) Int. Cl.
H02H 9/04 (2006.01)
H01C 7/108 (2006.01)
H01C 7/12 (2006.01)
H01H 9/54 (2006.01)

(52) U.S. Cl.
CPC ............... *H02H 9/04* (2013.01); *H01C 7/108* (2013.01); *H01C 7/12* (2013.01); *H01H 2009/543* (2013.01)

(58) Field of Classification Search
CPC .......... H02H 9/04; H02H 3/087; H02H 9/043; H02H 7/205; H01C 7/108; H01C 7/12; H01C 7/112; H01H 2009/543
USPC ...................................................... 361/2–13
See application file for complete search history.

(56) References Cited

U.S. PATENT DOCUMENTS 5,621,599 A * 4/1997 Larsen .................. H02H 9/041
361/91.8
2018/0331534 A1* 11/2018 Nojima .................. H03K 17/08
2021/0288636 A1* 9/2021 Song ................ H03K 17/08142

* cited by examiner

Primary Examiner — Danny Nguyen
(74) Attorney, Agent, or Firm — Naval Postgraduate School; Scott Bell

(57) ABSTRACT

A solid state circuit breaker that may include a metal oxide varistor (MOV) that is connected in series to a thyristor, the MOV to clamp voltage of current flowing through the solid state circuit breaker; the thyristor including a gate to control flow of the current to the MOV along a first path to the MOV; a breakover diode to activate at a target voltage level to allow the current to flow to the MOV along a second path; and a Zener diode to close the gate and allow current to flow along the first path in response to the current on the second path.

16 Claims, 2 Drawing Sheets

SOLID STATE CIRCUIT BREAKER WITH REDUCED CLAMPING VOLTAGE

CROSS-REFERENCE TO RELATED APPLICATIONS

This patent application is a non-provisional of and claims the benefit of U.S. Provisional application 63/173,329, filed Apr. 9, 2021, which is hereby incorporated by reference in its entirety.

BACKGROUND OF THE INVENTION

1. Field of the Invention

The present disclosure relates to solid state circuit breakers (SSCB's) in general, and, more particularly, to SSCB's suitable for protecting hybrid electric propulsion systems.

2. Description of the Related Art

Hybrid electric propulsion can improve fuel burn efficiency and reduce carbon emission in aviation applications. The power rating of the electrical power system to support hybrid electric propulsion is in the range of megawatts (MWs) or tens of MWs, which is much higher than the existing power system on existing commercial aircrafts. To reduce the total weight of electric power system, especially the cable weight, a medium voltage direct current (MVDC) system is selected due to its numerous advantages compared with the traditional alternative current (ac) system. However, the circuit breaker can create difficulties in the MVDC concept because the system fault current does not cross zero naturally like in an ac system. In addition, due to the lack of impedance to limit the fault current rising speed, the circuit breaker also should respond ultra-fast to avoid severe damage caused by the potential high fault current.

An SSCB can protect the hybrid electric propulsion system because of its rapid response time and simplicity compared to other alternatives, such as the mechanical circuit breaker and hybrid circuit breaker. An SSCB mainly consists of a semiconductor switch, an energy absorber, and a fault current limiting device.

SUMMARY OF THE INVENTION

Embodiments described herein related to a solid state circuit breaker. In some cases, the solid state circuit breaker includes a metal oxide varistor (MOV) that is connected in series to a thyristor, the MOV to clamp voltage of current flowing through the solid state circuit breaker; the thyristor comprising a gate to control flow of the current to the MOV along a first path to the MOV; a breakover diode to activate at a target voltage level to allow the current to flow to the MOV along a second path; and a Zener diode to close the gate and allow current to flow along the first path in response to the current on the second path.

In some embodiments, the solid state circuit breaker further includes a second thyristor that is antiparallel to the thyristor and is connected in series to the MOV, the second thyristor comprising a second gate to control flow of the current to the MOV along a third path.

Embodiments in accordance with the invention are best understood by reference to the following detailed description when read in conjunction with the accompanying drawings.

Embodiments in accordance with the invention are further described herein with reference to the drawings.

DETAILED DESCRIPTION OF THE INVENTION

The following description is provided to enable any person skilled in the art to use the invention and sets forth the best mode contemplated by the inventor for carrying out the invention. Various modifications, however, will remain readily apparent to those skilled in the art since the principles of the present invention are defined herein specifically to provide to solid state circuit breakers.

Figure 1:
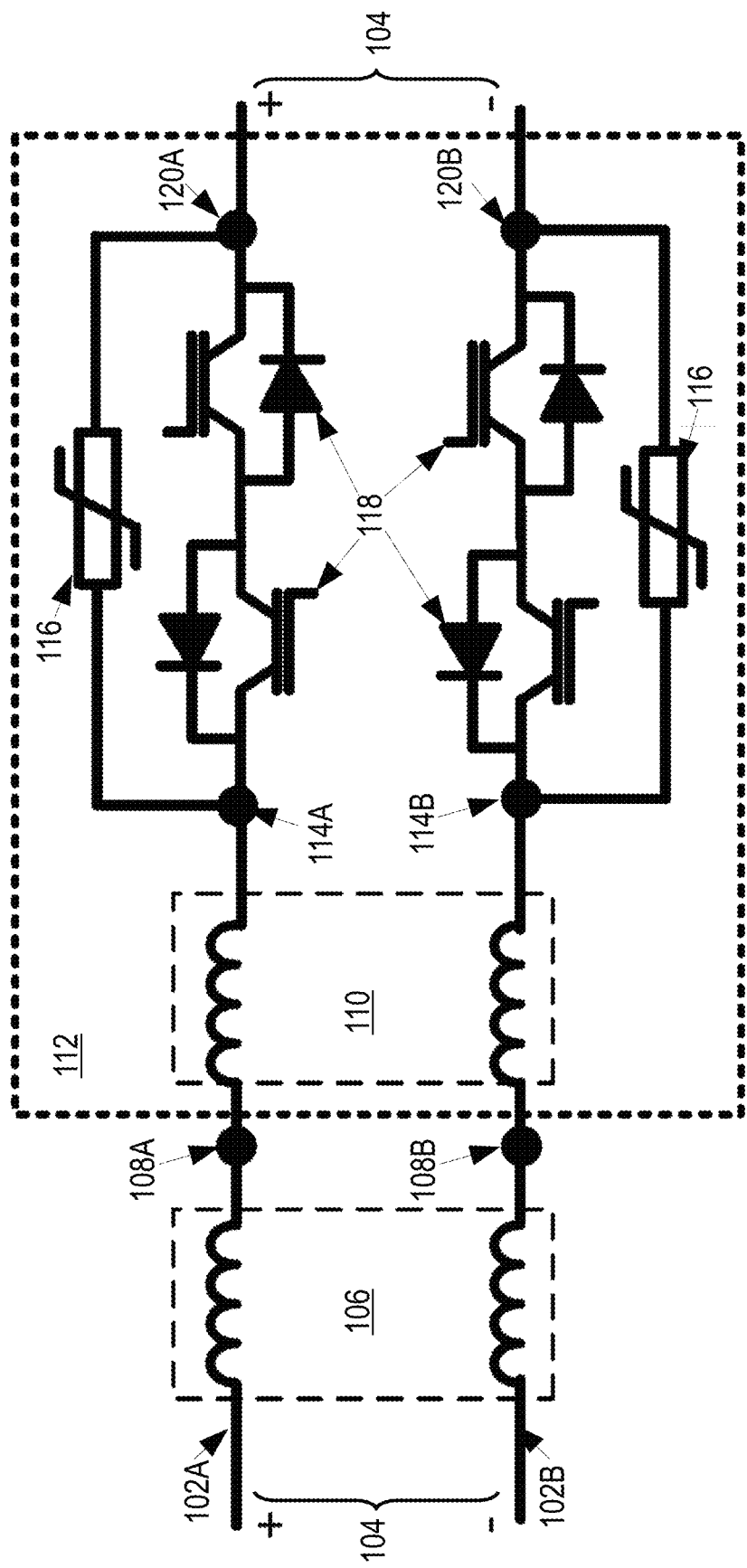
FIG. 1 shows a typical SSCB in accordance with the prior art.

A typical SSCB 112 in the prior art is shown in FIG. 1. In normal operation, the power semiconductors 118 are turned on to carry current. When the system current surges due to system fault, such as ground or line to line short circuit fault, the power semiconductors 118 are turned off commutating system fault current to their parallel the metal oxide varistors (MOVs) 116. Then, the MOV can reduce the fault current and finally clear the faults.

In some examples, the power semiconductors 118 may be insulated-gate bipolar transistors (IGBT). Other SSCB 112 involving different types of semiconductors, such as Silicon carbide metal-oxide-semiconductor field-effect transistors can be used. Under normal operation condition, the voltage across the SSCB 112 is close to zero and system current only flows through the power semiconductors 118. When a short circuit fault occurs, and the power semiconductors' 118 current increases. The rising slope of power semiconductors' 118 current is determined by the system dc voltage 104, the total inductance of the system ($L_{sys}$) 106, and inductance of the SSCB ($L_{CB}$) 110. It is noteworthy that $L_{sys}$ 106 is not only determined by the system parameters, such as cable length, but also the fault location.

For example, if the B 108A and B' 108B are shorted, the short circuit current flowing through the SSCB 112 in FIG. 1 is limited by the $L_{CB}$ 110 no matter the value of the system inductance 106. This is a reason to consider the fault current limiting inductor in the traditional design to ensure that the peak fault current is within the safe level even in the extreme case.

When the fault current exceeds the predefined protection level, the fault protection scheme is activated. After a certain delay time, the power semiconductors 118 are turned off and commutate the current to MOV 116. In between, the peak fault current could be clamped by the power semiconductors 118 saturation current level. Those skilled in the art will appreciate that power semiconductors 118 such as IGBT's normally operates in saturation region with only a few volts voltage drop. Once the current is high enough, an IGBT 118 exits the saturation region and enters the active region, and the voltage across the IGBT 118 increases rapidly until it reaches the system dc voltage level 104. After the system dc voltage level 104 is reached, the system current or IGBT 118 current cannot further increase and is clamped instead.

When the power semiconductors 118 are turned off, the current flowing through power semiconductors 118 is commuted into MOV 116 and the voltage across the SSCB is determined by the MOV 116 clamping voltage, which is higher than the system dc voltage 104 and eventually drive the system current to zero and clear the fault. After that, MOV 116 continues to block the system dc voltage 104.

To support the operation of SSCB 112, the MOV 116 should be able to block the system dc voltage 104 continuously, which means the leakage current of MOV 116 at system dc voltage 104 should be low enough not to cause thermal stress. Secondly, the MOV's 116 clamping voltage when carry the system fault current should be lower than the power semiconductors' 118 voltage rating; otherwise, the power semiconductors 118 can be damaged by over voltage in as short as a few μs.

Those skilled in the art will appreciate that semiconductors 118 with higher voltage rating generate more conduction loss when carrying the same current. Thus, to minimize the SSCB 112 power loss, which is dominated by the semiconductors' 118 conduction loss, a semiconductor 118 with lower voltage rating is preferred. In other words, a MOV 116 that can block the system voltage 104 continuously and have lower clamping voltage can help to improve the SSCB 112 efficiency. A typical ratio between the MOV 116 clamping voltage and continuous blocking voltage is around 2.

Embodiments described herein reduce peak clamp voltage in comparison to the classic topology in FIG. 1. In some embodiments, two antiparallel thyristors are connected in series with a MOV. During normal operation, the thyristors are off and power semiconductors carry the load current. The thyristors can be activated after the fault is detected and before the power semiconductors are turned on. Before the power semiconductors are turned on, a thyristor withstands the voltage across the SSCB. After the power semiconductors are turned on, the SSCB's voltage will be applied to MOV. Then the power semiconductors can be turned off and the fault current can flow through the MOV, similar to the classical SSCB. When the fault current flows through the MOV, the thyristor's gate voltage can be removed. Since the thyristor cannot be forced to turn off, the thyristor maintains an on state until the fault current is reduced by MOV to a level which is lower than the hold on current level of the thyristor. Then the thyristors and MOV can withstand the dc system voltage together; however, the leakage current of the thyristors is much lower than the leakage current of MOV. In other words, the equivalent resistance of the thyristors is much higher than the MOV, so most of the voltage is withstood by the thyristors. In these embodiments, the power loss in the MOV is negligible. It was previously assumed that the MOV current could only flow through the thyristors, which is true if the thyristors have active controlled gate drive. If additional passive control circuit are involved to boost the system simplicity and reliability, the thyristor only shares part of the system voltage while still reducing the peak clamp voltage.

In prior art systems, several MOVs can be used in parallel to shape the equivalent MOV V/I curve to reduce the peak clamping voltage (fault current is shared by the parallel MOVs thus reducing the current per MOV and hence its voltage). However, parallel MOVs increases the weight, size and cost of the SSCB. Embodiments herein describe a new voltage clamping circuit (VCC), coined as the electronic MOV or eMOV module, to address the aforementioned drawbacks.

Figure 2:
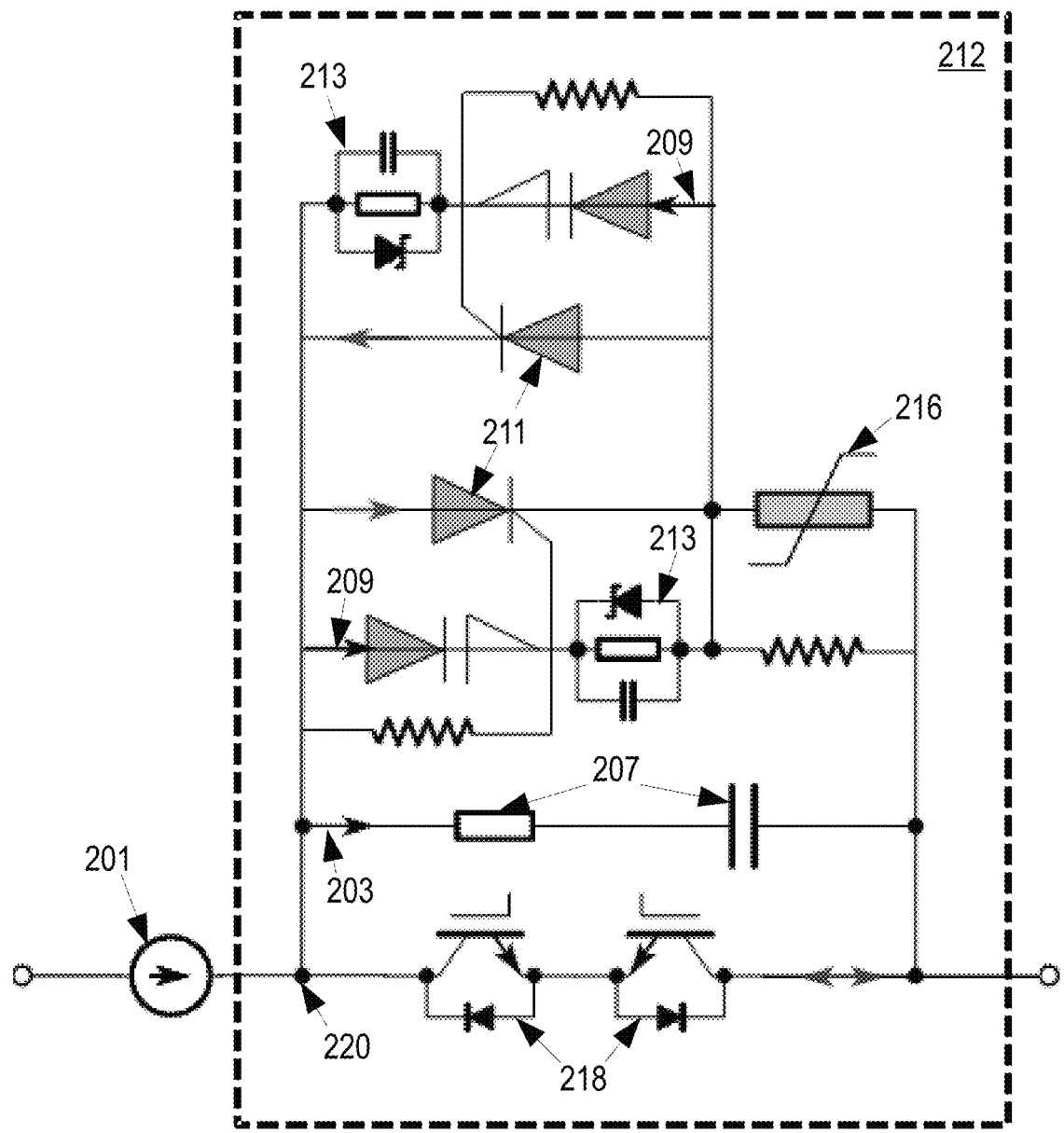
FIG. 2 shows a SSCB in accordance with the prior with embodiments.

A SSCB 212 exemplifying the proposed embodiment is shown in FIG. 2. The SSCB 212 includes RC slapper 207, breakover diodes 209, thyristors 211, Zener diodes 213, MOVs 216, and power semiconductors 218. In the proposed circuit, additional passive components are added to the traditional MOV 216 circuit which allows the user to decouple the peak clamping voltage of the VCC from its dc withstand voltage to allow freedom in the selection of the voltage ratio to maximize the voltage utilization of the solid state switch 220. The main additional components include break over diodes (BOD) 209, a reverse blocking Zener diode 213, thyristors (silicon controlled rectifier [SCR]) 211 and RC snubbers (RC slappers) 207 for both the solid state switch 220 and the SCR 211 gate-cathode connections.

With the proposed circuit, the system dc voltage in the standby mode is shared by the BOD 209 and the MOV 216 whereas during the fault transient, the SCR 211 is triggered on (once the BOD 209 breaks over) to allow MOV 216 clamping action much like the traditional circuit. In this way, the MOV 216 peak clamping voltage (and its dc withstand voltage $V_{M,DC}$) value can be selected independent of the system dc voltage to achieve voltage ratios lower than 1.9.

Standby Mode

The voltage/pole is shared by the BOD 209 and the MOV 216 during the standby mode. The BOD 209 is an asymmetrical device (uses a series P-N diode for reverse voltage blocking), which remains reverse biased until the voltage across its Anode-Cathode reaches the breakover voltage $V_{BO}$. Both the BOD 209 and MOV 216 are non-linear parts with different leakage currents in the nA-μA range in the blocking region. High value (MI) static balancing resistors can be used in parallel across them to force voltage sharing in the standby mode so that neither of the two ratings, $V_{M,DC}$ or $V_{BO}$, are exceeded. For successful operation in the standby mode—it should be ensured that the SCR 211 remains in the off state when the total dc voltage $V_{dc}$ is applied across the pole (single pole interruption case). The MOV 216 and BOD 209 parts are selected such that (1) is met:

$$V_{M,DC} + V_{BO} > V_{dc} \qquad (1)$$

Another important point to note is that the total leakage current of the eMOV 209, 211, 216 in the standby mode should be below the SCR holding current so it will be turned off during this period.

Fault Turn-Off Transient

During the fault turn-off event, the eMOV circuit 209, 211, 216 should trigger the SCR 211 "on" to allow transfer of the fault current to the MOV 216. The current continues to flow through the solid state switch 220 until it is gated off. After the solid state switch 220 is gated off, the current transfers to the RC branch 203 charging the snubber 207 capacitor. Those skilled in the art will appreciate that the snubber 207 is optional. The BOD 209 being a much smaller part (in comparison to the MOV 216) has a lower leakage current (in nA), and the BOD's 209 voltage starts to increase during this time period. Once the BOD 209 voltage reaches $V_{BO}$, the BOD 209 starts to conduct, immediately triggering on the SCR 211 to commutate the current to the MOV 216. The total voltage across the solid state switch 220 at this point is given by Vth which is the sum of the breakover voltage $V_{BO}$ of the BOD 209 and the MOV 216 voltage at the breakover current, i.e. $V_{MOV}(I_{BO})$, (typically ~15 mA).

After the BOD 209 voltage reaches $V_{BO}$, the MOV 216 establishes the clamping voltage and drives the fault current to zero. The RC snubber 207 branch in parallel with the solid state device 218 helps ensure that the SCR 211 di/dt and dv/dt are below its critical limits. To prevent overvoltage across the solid state switch 220 (i.e. the voltage rating $V_{SS,rated}$ is not exceeded), the following two conditions should be satisfied:

$$V_{MOV}(I_{BO})+V_{BO}<V_{SS,rated} \qquad (2)$$

$$V_{MOV}(I_{pk})<V_{SS,rated} \qquad (3)$$

In some embodiments described herein, the MOV 216 can be selected based on the requirement of maximum clamp voltage, which is determined by the power semiconductors 218 voltage rating. This allows power semiconductors 218 with a low voltage rating to be selected, which substantially increases the efficiency of SSCB 212. For example, if the system dc voltage is 1 kV, a 3.3 kV class IGBT 218 can be selected instead of a 4.5 kV class IGBT 218 in the prior art method. Further, any MOV 216 with a clamping voltage lower than 3.3 kV can be used as long as the MOV's 216 leakage current at system dc voltage is lower than hold on current level of the thyristor 211. In this example, the V112BB60 MOV 211 can be used since the leakage current when MOV 216 is blocking 1.8 kV dc voltage is in the range of 100 s of mA, which is low enough to allow the thyristor 211 self-turn-off.

In some embodiments described herein, thyristors 211 are not carrying current during normal operation, so no additional power loss is introduced with the added thyristors 211. Thus, there is no power loss penalty, which improves SSCB 212 efficiency.

For example, if 4.5 kV device is selected as the thyristors 211, such as FZ800R45KL3_B5, the voltage drop while carrying 1000 A is 3.5V. If 3.3 kV device is selected as the thyristors 211, such as FZ1400R33HE4, which has the same physical dimension as FZ800R45KL3_B5, the voltage drop while carrying the same current is 2.5V. In other words, the power loss can be reduced by 30%.

In some embodiments, the thyristors 211 should handle the same fault current flowing through MOV 216; however, thyristors 211 have a much better surge current handing capability compared with other semiconductor devices. For example, a 320 A 3.3 kV thyristor 211 can handle 5 kA for 10 ms, and with passive control circuit, the thyristor 211 voltage rating can be further reduced such that, for example, a 1600V 181 A thyristor 211 can handle 6 kA for 10 ms. Considering fault current is typically cleared within 10 s to 100 s of μs, a thyristor 211 with a low current rating or mechanical dimension/weight can meet the requirement, which has minimum impact on the system design.

To achieve the above-mentioned benefits, the thyristors 211 should be turned on after a fault is detected and turned off after fault current is reduced by MOV 216 to allow the fault current flowing through MOV 216.

In some embodiments, the thyristor 211 control can be implemented with an active control gate circuit. With the active control circuit, a separated control signal is used to trigger the gate drive circuit of the thyristor 211, such as the fault detection signal from the SS switch 220 drive or separate digital controller. Further, power supply and additional gate drive boards can be used to turn on the thyristor 211 when the digital signal is received. This technique provides a lot of control freedom but can also introduce additional components which will increase the SSCB 212 complexity, weight, and may affect the reliability of the devices.

In some embodiments, components of SSCB 212 can be selected according to the following criteria:

MOV 206 leakage current at system dc voltage should be lower than the thyristor 211 hold-on current level.

MOV 206 clamping voltage must be lower than the semiconductor 218 voltage rating.

If the MOV 206 leakage current is $I_0$ when it withstands its maximum continuous voltage. The BOD 209 voltage at the leakage current of $I_0$ should be higher than the difference between the system dc voltage and MOV's 206 maximum continuous voltage.

If the BOD 209 current is $I_1$, when it reaches its break over voltage level. The MOV voltage at the current of $I_1$ should be lower than the difference between the semiconductor 218 voltage rating and the BOD 209 breakover voltage.

This description provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

It is to be understood that the above-described arrangements are only illustrative of the application of the principles of the present invention, and it is not intended to be exhaustive or limit the invention to the precise form disclosed. Numerous modifications and alternative arrangements may be devised by those skilled in the art in light of the above teachings without departing from the spirit and scope of the present invention.

What is claimed is:

1. A solid state circuit breaker comprising:
    a metal oxide varistor (MOV) that is connected in series to a thyristor, the MOV to clamp voltage of current flowing through the solid state circuit breaker;
    the thyristor comprising a gate to control flow of the current to the MOV along a first path to the MOV;
    a breakover diode to activate at a target voltage level to allow the current to flow to the MOV along a second path;
    a Zener diode to close the gate and allow current to flow along the first path in response to the current on the second path, and
    an RC slapper on a fourth path that bypasses the MOV, the RC slapper to initially and temporarily carry current when the solid state circuit breaker is activated.

2. The solid state circuit breaker of claim 1, further comprising a second thyristor that is antiparallel to the thyristor and is connected in series to the MOV, the second thyristor comprising a second gate to control flow of the current to the MOV along a third path.

3. The solid state circuit breaker of claim 1, wherein the Zener diode further comprises a resistor-capacitor to prevent the thyristor gate from closing prematurely.

4. The solid state circuit breaker of claim 1, wherein the MOV has a voltage ratio between clamping voltage and continuous blocking voltage of less than 1.9.

5. The solid state circuit breaker of claim 1, wherein the MOV has a leakage current at system DC voltage that is lower than a hold-on current level of the thyristor.

6. The solid state circuit breaker of claim 1, wherein the MOV has a clamping voltage that is lower than a voltage rating of a semiconductor connected to the solid state circuit breaker.

7. The solid state circuit breaker of claim 1, wherein the MOV has a leakage current at a maximum continuous voltage, and wherein a voltage of the breakover diode at the leakage current is higher than a difference between a system dc voltage and the maximum continuous voltage.

8. The solid state circuit breaker of claim 1, wherein the breakover diode has a breakover current when the breakover voltage level is reached, and wherein the MOV has a MOV voltage at the breakover current that is lower than a difference between a voltage rating of a semiconductor connected to the solid state circuit breaker and a breakover voltage of the breakover diode.

9. A solid state circuit breaker comprising:
  a metal oxide varistor (MOV) that is connected in series to a first thyristor, the MOV to clamp voltage of current flowing through the solid state circuit breaker;
  the first thyristor comprising a first gate to control flow of the current to the MOV along a first path to the MOV;
  a breakover diode to activate at a target voltage level to allow the current to flow to the MOV along a second path;
  a Zener diode to close the first gate and allow current to flow along the first path in response to the current on the second path; and
  a second thyristor that is antiparallel to the first thyristor and is connected in series to the MOV, the second thyristor comprising a second gate to control flow of the current to the MOV along a third path.

10. The solid state circuit breaker of claim 9, further comprising an RC slapper on a fourth path that bypasses the MOV, the RC slapper to initially and temporarily carry current when the solid state circuit breaker is activated.

11. The solid state circuit breaker of claim 9, wherein the Zener diode further comprises a resistor-capacitor to prevent the first gate from closing prematurely.

12. The solid state circuit breaker of claim 9, wherein the MOV has a voltage ratio between clamping voltage and continuous blocking voltage of less than 1.9.

13. The solid state circuit breaker of claim 9, wherein the MOV has a leakage current at system DC voltage that is lower than a hold-on current level of the first thyristor.

14. The solid state circuit breaker of claim 9, wherein the MOV has a clamping voltage that is lower than a voltage rating of a semiconductor connected to the solid state circuit breaker.

15. The solid state circuit breaker of claim 9, wherein the MOV has a leakage current at a maximum continuous voltage, and wherein a voltage of the breakover diode at the leakage current is higher than a difference between a system dc voltage and the maximum continuous voltage.

16. The solid state circuit breaker of claim 9, wherein the breakover diode has a breakover current when the breakover voltage level is reached, and wherein the MOV has a MOV voltage at the breakover current that is lower than a difference between a voltage rating of a semiconductor connected to the solid state circuit breaker and a breakover voltage of the breakover diode.

* * * * *